United States Patent
Habermehl

(10) Patent No.: US 11,281,000 B2
(45) Date of Patent: Mar. 22, 2022

(54) HEAD-UP DISPLAY

(71) Applicant: Continental Automotive GmbH, Hannover (DE)

(72) Inventor: Kai Habermehl, Hannover (DE)

(73) Assignee: Continental Automotive GmbH, Hannover (DE)

( * ) Notice: Subject to any disclaimer, the term of this patent is extended or adjusted under 35 U.S.C. 154(b) by 161 days.

(21) Appl. No.: 16/662,162

(22) Filed: Oct. 24, 2019

(65) Prior Publication Data
US 2020/0124848 A1 Apr. 23, 2020

Related U.S. Application Data

(63) Continuation of application No. PCT/EP2018/060297, filed on Apr. 23, 2018.

(30) Foreign Application Priority Data

Apr. 24, 2017 (DE) ..................... 10 2017 206 805.1

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *G02B 27/0149* (2013.01);
(Continued)

(58) Field of Classification Search
CPC ............ G02B 27/0149; G02B 27/0101; G02B 2027/0154; G02B 2027/0156; G02B 27/01; B60K 2370/1529; B60K 35/00
See application file for complete search history.

(56) References Cited

U.S. PATENT DOCUMENTS

| 4,886,328 A | 12/1989 | Iino |
| 2014/0103196 A1* | 4/2014 | Soga ..................... H01L 27/144 250/208.2 |

(Continued)

FOREIGN PATENT DOCUMENTS

| DE | 10044221 A1 | 4/2001 |
| DE | 102011105689 A1 | 12/2012 |

(Continued)

OTHER PUBLICATIONS

Office Action dated Jan. 10, 2018 from corresponding German Patent Application No. DE 102017206805.1.
(Continued)

*Primary Examiner* — Ryan D Howard

(57) ABSTRACT

A head-up display unit is protected from damage caused by light entering from the outside. The head-up display comprises a display element whose image is projected onto a mirror unit of a vehicle at a critical angle by a deflection unit and is reflected from there in the direction of the eye of a driver overlaid on an image of the surroundings, and a light-sensitive sensor. The sensor detects ambient light that enters from the mirror element into the deflection unit at the critical angle, and the head-up display comprises a control unit at the control input of which a signal of the sensor is present, and whose control output is connected to a parking device for the head-up display.

21 Claims, 3 Drawing Sheets

(52) U.S. Cl.
    CPC ............... *B60K 2370/1529* (2019.05); *G02B 2027/0118* (2013.01); *G02B 2027/0156* (2013.01)

(56) References Cited

U.S. PATENT DOCUMENTS

| | | |
|---|---|---|
| 2014/0132852 A1 | 5/2014 | Pawusch |
| 2014/0306878 A1* | 10/2014 | Bhakta ............... G02B 27/017 345/156 |
| 2015/0098029 A1 | 4/2015 | Sato et al. |
| 2016/0306169 A1 | 10/2016 | Nambara |

FOREIGN PATENT DOCUMENTS

| | | |
|---|---|---|
| EP | 2843652 A1 | 3/2015 |
| JP | 2005331624 A | 12/2005 |

OTHER PUBLICATIONS

International Search Report and Written Opinion dated Jul. 25, 2018 from corresponding International Patent Application No. PCT/EP2018/060297.

* cited by examiner

HEAD-UP DISPLAY

CROSS-REFERENCE TO RELATED APPLICATION

This application is a continuation application of International Application No. PCT/EP2018/060297, filed Apr. 23, 2018, which claims priority to German Patent Application No. DE 10 2017 206 805.1, filed Apr. 24, 2017, wherein the contents of such applications are incorporated herein by reference.

TECHNICAL FIELD

The present invention relates to a head-up display in which a display unit is protected from damage caused by light entering from the outside and a method for its operation.

BACKGROUND

A head-up display generates a virtual image in the windshield that is visible for the driver. This image is usually generated on a display unit, for example a liquid-crystal display (LCD) and reflected to the windshield through a hole in the instrument panel by means of mirrors.

Head-up displays are often protected from incoming solar radiation by complex and expensive measures such as polarization membranes, dichroic reflectors and the like in order to protect the display unit from overheating. The costs of the countermeasures, in particular the costs for polarization membranes or dichroic reflectors, are quite high. In addition, these measures only delay the damage to the display unit for a certain time. When countermeasures that are based on polarization are used, such as an image may disappear if the driver uses polarizing sunglasses. Additionally, polarization membranes that are applied to the head-up display shimmer and are therefore may be regarded as irritating.

A head-up display has a display element whose image is projected onto a mirror unit of a vehicle at a critical angle by means of an optical path, and is reflected from there, overlaid on an image of the surroundings, in the direction of the driver. Its display element is protected against damage from sunlight entering directly in that a light-sensitive sensor detects the incoming sunlight and, when the intensity is too high, reduces the luminous intensity of a lighting unit for the display element or switches the lighting unit off entirely. The total quantity of light incident on the display element is thereby reduced, which increases its service life. The intensity of the incident sunlight is not, however, limited, as a result of which damage to the display element is delayed, but not prevented.

A head-up display in which the rise in temperature of a display element is limited has an estimation which is performed as to whether the current position of the sun is such that there is a risk that too much sunlight falls onto the display element, such that its temperature is therefore raised too much, and that it may thereby be damaged. In this case, the light falling onto the display element is reduced by a filter that is inserted into the optical path. However, the estimation may be incorrect, in particular if it is based on an incorrectly determined geographical position of the vehicle, an incorrect time of day or if, as a result of the weather, little direct sunlight is falling onto the display element. In that case the optical filter also reduces the quantity of light of the image of the head-up display that is directed in the direction of the driver, and therefore it must forgo an optimally bright image of the display even though unnecessary.

A reliable protection of the display element of a head-up display from damage from ambient light, without limiting the operation of the head-up display unnecessarily, is desirable. It is also desirable to achieve this as economically as possible.

SUMMARY

A head-up display has a sensor that detects ambient light which enters the optical path coming from the mirror unit at a critical angle. A control unit is provided, at the input of which the signal of the sensor is present, and whose control output is connected to a parking device for the head-up display. In the event of strong light entering at the critical angle, this is detected by the sensor, whereupon the parking unit, driven by the control unit, moves the head-up display into a parking position in which the light entering at the critical angle does not fall onto the display element. The display element provided here may be a liquid-crystal element, also known as an LC display or LCD, an OLED element that comprises organic light-emitting diodes, or another display element that reacts sensitively to certain frequencies of the incoming light or in general needs to be protected from overheating caused by incoming light. The windshield, or a so-called combiner, a partially reflecting mirror that is arranged between the driver and the windshield, is generally used as the mirror unit.

The vehicle may be a land vehicle, a watercraft or an aircraft. The driver, in whose direction the image of the display element, overlaid on the image of the surroundings, is projected, may be the person who steers the vehicle. The overlaid image may be in addition or alternatively provided for the co-driver or another passenger of the vehicle.

The sensor is an angle-dependent sensor that detects ambient light which is entering the optical path coming from the mirror unit at a critical angle. When the head-up display is in the operating position, all or a high proportion of the ambient light that enters at this angle and at a range of angles surrounding it reaches the display element, possibly damaging it if there is a long period of exposure or even a short period of very high intensity. The head-up display is therefore placed into a parking position in the event of incoming ambient light in this critical range of angles.

Damaging ambient light is, in general, directly entering sunlight, but can also originate from other strong light sources that heat the display element excessively or damage it in some other manner. These are, for example, strong, artificial sources of light for street lighting which enters at the critical angle for a lengthy period when the vehicle is travelling slowly or stationary.

The parking position of the head-up display is reached by closing the cover of the head-up display, whereby the beam path is interrupted. Other means that are suitable for interrupting the beam path are also used according to the invention. Tilting the mirror unit or another mirror located in the beam path thus also interrupts the beam path and prevents light that is entering in the critical range of angles from reaching the display element.

In one embodiment a head-up display comprises a light tunnel that is aligned according to a critical angle, and at the end of which a sensor is arranged. This ensures that only light that is incident at the critical angle, or in the critical range of angles, is registered by the sensor. The sensor itself therefore does not have to have any angle-dependent design. The light tunnel is integrated into the housing of the head-up display or into another component of the head-up display, for example in a plastic component manufactured using injection molding.

According to one embodiment, the light tunnel comprises one or a plurality of absorptive wall surfaces on its inner side. This has the effect that only light that enters at the critical angle passes through the tunnel in a straight line, whereas light entering from outside the critical range of angles is absorbed by the wall surfaces and is thus not detected by the sensor.

One or a plurality of conically shaped, inclined wall surfaces allow the critical angle to be extended to a range of critical angles, for example to +/−5° deviation from the critical angle, in which incoming ambient light of too high an intensity also leads to damage to the display element. The light tunnel is, for example, a circular cone, i.e. having a single, conical, inclined wall surface. A plurality of conically shaped inclined wall surfaces form the surface of a cone with a non-circular cross-section, for example a quadrilateral or hexagonal cross-section, or even an irregularly shaped cross-section. Shapes deviating from a circular cone in this way are suitable for adapting the range of critical angles detected by the sensor to the geometric shape of the display element.

One or a plurality of separating surfaces are arranged between the wall surfaces of the light tunnel. They are arranged essentially parallel to the wall surfaces, and also have the effect that only light from the critical angle or critical angle range falls on the sensor element, even if the cross-section of the light tunnel has been chosen to be relatively large or its length is relatively short in comparison with its cross-section.

In this case, many small light tunnels are formed by the wall surfaces, which likewise ensure a high angular selectivity in spite of a less than ideal ratio between the length and the cross-section of the light tunnel. In general, a plurality of separating surfaces are used; with a high length and a comparatively small cross-section of the light tunnel. However, even one separating surface can be sufficient to achieve the desired angular selectivity. If the light tunnel comprises conically inclined wall surfaces, the separating surfaces may be aligned to the same point of convergence as the wall surfaces of the funnel.

In one embodiment, the light tunnel is arranged at a housing of the head-up display in the vicinity of the light output opening of the beam path. Therefore, the critical angle can easily be determined, and no other effects arise from elements arranged in the interior of the head-up display that make it more difficult for the light tunnel to be arranged at the correct angle. The light tunnel may be designed as one piece with the housing, for example as a plastic part, that is manufactured by injection molding simultaneously with the housing, or as a separate component that is molded into the housing at the time of its manufacture or inserted into an opening in the housing.

In one embodiment, the control unit comprises a delay unit and, as an alternative or in addition to that, an integration unit. The effect of the delay unit is that exceeding a threshold value of the intensity of the light entering at the critical angle for only a short time does not have the effect that the parking position is adopted. Such as, for example, briefly driving over a bump in the ground, driving fast round a curve, sunlight being reflected from a reflecting element located outside the vehicle, for example the glass frontage of a house past which the vehicle drives. Therefore, no interruption of the image of the display of the display element visible for the driver occurs. Only a slight heating of the display element occurs in the case of such briefly occurring high light intensities, and this only leads to a slight damage to the display element or to none at all. Instead of or in addition to the delay unit, an integration unit is provided which integrates the intensity of the incoming light over a certain period, and has the effect that the parking position is only adopted when a certain total energy has been incident within a certain critical period. It releases the parking position again when the total energy, again the total energy incident within a critical period, has again fallen under a critical value. This is helpful if, for example, driving takes place along a tree-lined street where, due to the gaps between the leaves, a high light intensity only falls briefly onto the sensor each time, but over a longer period, however, this nevertheless leads to a critical heating of the display element or to damaging it in some other way.

In one embodiment, the light tunnel has a length that is a multiple of its diameter. Such a light tunnel, with a length that is large when compared to its cross-section, which provides good angular sensitivity.

According to one variant, the head-up display comprises a plurality of separating walls which form a plurality of small light tunnels with a cross-section that is small in comparison with their length. This combines good angular sensitivity with a short structural length.

A conically shaped wall surface and inclined separating surfaces that are all aligned to the same point of convergence are provided according to one embodiment. A sensor is located at or close to the point of convergence. Therefore, light from an angular range defined by the conical shape is taken into account.

The light tunnel may be injection-molded into a housing of the head-up display. This is prefabricated with a suitable precision. Lower requirements for precision are then sufficient when injection-molding into the housing.

If the light tunnel has a square cross-section, this provides an uncomplicated manufacture. If it has a rectangular cross-section, this provides that the light tunnel is adapted to the often-used longitudinal form of the display element.

According to one embodiment, the light tunnel is formed by a recess in an outer wall of the head-up display. Therefore, it is easy to adapt to pre-existing product designs that only need to be changed slightly in order to implement the solution.

According to a further embodiment, the light tunnel comprises conically shaped, inclined wall surfaces that form a truncated cone with a square cross-section.

A method for the operation of a head-up display comprises detecting ambient light that enters the head-up display in a critical angular range. If the intensity of the light that is entering in the critical angular range exceeds a first threshold value, then the head-up display is moved from an operating position into a parking position. If the intensity of the light that is entering in the critical angular range falls below a second threshold value, then the head-up display is moved from the parking position back into an operating position.

Exceeding the first threshold value occurs when the sensor signal exceeds a certain value, regardless of for how long this certain value is exceeded. Alternatively, exceeding the threshold value occurs when the sensor signal exceeds a certain value for more than a certain period. It is alternatively provided that the sensor signal is integrated over a time window, and the parking position is then adopted if the integrated signal exceeds a certain value. The second threshold value is may be lower than the first threshold value.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
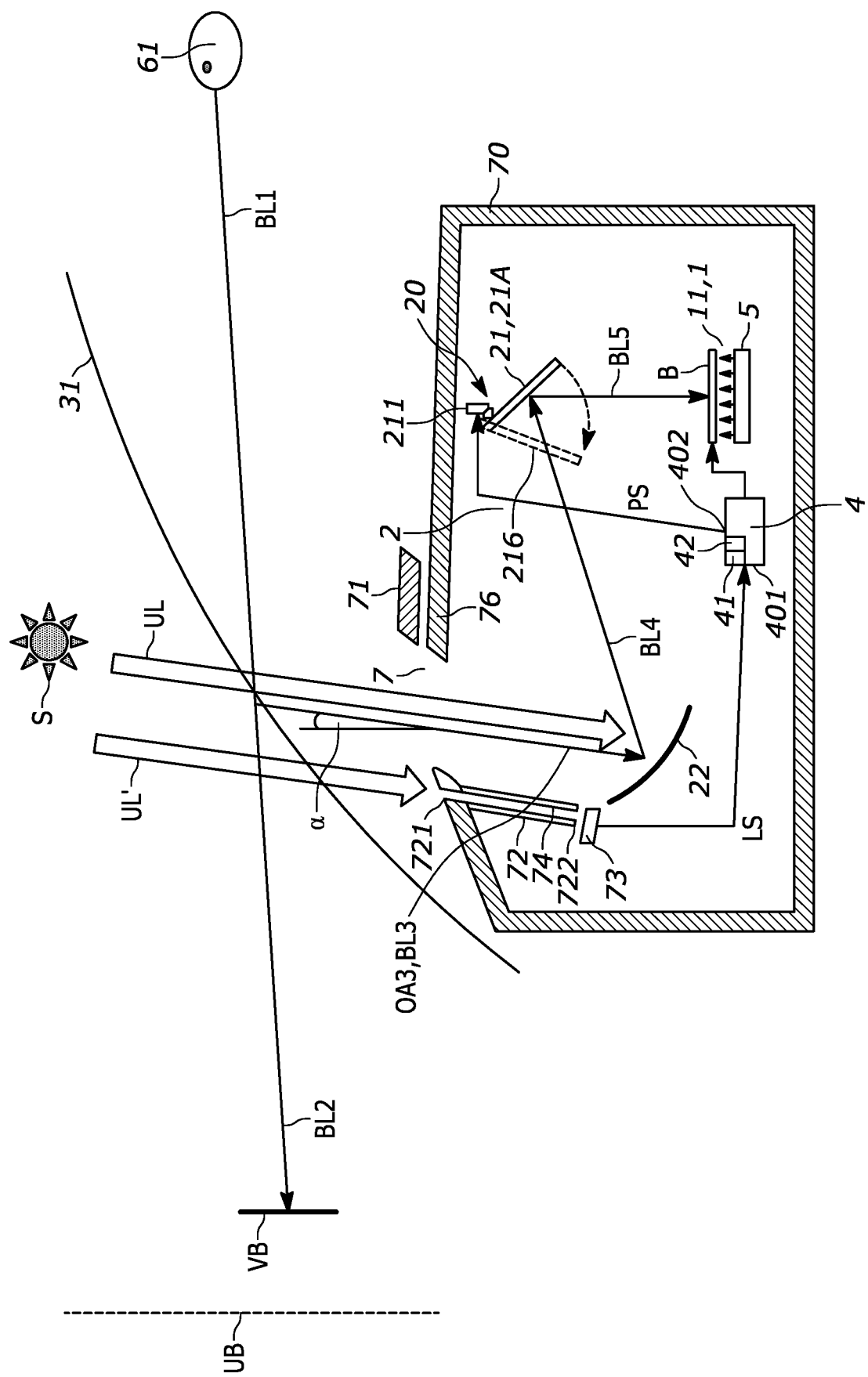
FIG. 1 shows a head-up display.

FIG. 1 shows a head-up display. An image B that is to be displayed is shown on a display element 11 of a display unit 1. The display element 11 here is a liquid-crystal display element which is backlit by a light source 5 and receives a signal for the image B that is to be displayed from a control unit 4. The image B that is to be displayed appears to the driver to float as a virtual image VB in the space outside and in front of the vehicle. This view BL1 does not in fact extend along the view BL2 to the virtual image VB displayed in front of the vehicle, but is reflected at the windshield 31 via BL3, BL4 and BL5 to the display element 11. The view BL thus runs in the opposite direction to the beam path of the light emerging from the display element 11.

Starting from the display element 11, this is reflected at an adjustable mirror 21, projected from this to a curved mirror 22 and reflected from this onto the windshield 31, from where it falls into the eye 61 of the driver. Since the windshield 31 is partially reflective and partially transparent, the image B is overlaid as a virtual image VB on the image of the surroundings UB entering through the windshield 31. The curvature of the curved mirror 22 compensates for the curvature of the windshield 31, so that the eye 61 of the driver perceives an undistorted image B. The adjustable mirror 21 and the curved mirror 22 are part of a deflection unit 2 that forms the optical path between the display element 11 and the outlet opening 7 of the head-up display. The adjustable mirror 21 is adjusted by a drive 211. The two together form the parking device 20.

The optical axis OA3 of the light emerging from the outlet opening 7 has a critical angle α to the perpendicular. The optical axis OA3 generally extends perpendicularly in a plane perpendicular to the plane of the drawing. Depending on the vehicle geometry, the arrangement of the head-up display and other factors, a critical angle other than 90° can however also occur here.

Only the critical angle α lying in the plane of the drawing will be considered in the following; a critical angle lying in a plane that extends perpendicularly to the plane of the drawing is to be correspondingly considered according to the invention. For the sake of simplicity, the angle α will be spoken of below, although in fact it is a relatively narrow angular range, both in the plane of the drawing as well as in a plane extending perpendicular to this. This angular range must be described with $\alpha x+/-\Delta x$ and $\alpha y+/-\Delta y$, where x and y describe directions that are mutually orthogonal.

The ambient light UL coming from the sun S falls, in the illustration, at the critical angle α through the outlet opening 7 into the deflection unit 2. It thus reaches the display element 11, and damages it through overheating or through other damage caused by strong incident light. To prevent this, the adjustable mirror 21 is pivoted from its illustrated operating position 21a into a parking position 21b shown with dashed lines. Pivoting in the opposite direction in order to adopt an alternative parking position not shown here is also usefully possible here. This also relates to pivoting about an axis which, unlike the axis illustrated here, is not perpendicular to the plane of the drawing.

If the adjustable mirror 21 is in its parking position 21b, no ambient light UL falls onto the display element 11 any longer. Alternatively or in addition, the curved mirror 22 can also be pivoted from its operating position shown here into a parking position not shown here. Closing the outlet opening 7 by means of a lid 71, which is shown here in the operating position, also places the head-up display into a parking position.

Another element that interrupts the beam path, similar to the lid 71, can also be arranged at another location inside the head-up display. The ambient light UL also falls as ambient light UL' into the light tunnel 72, while a light-sensitive sensor 73 is arranged at the end 722 thereof that is opposite to the inlet opening 721. Its output signal LS is passed to a control input 401 of the control unit 41. During most of the period of operation of the head-up display, the sun S is located at a position that is different from the critical position illustrated, at which the ambient light UL' enters at the critical angle α. If the sun S is in a position other than the critical position illustrated here, the ambient light UL' coming from the sun S cannot pass through the light tunnel 72, but is absorbed, mostly already in its upper region, at a wall surface 74 on the inner side of the light tunnel 72. Normally, therefore, the sensor 73 only outputs a very small output signal LS.

If, however, the sun S is in a position in which the ambient light UL' coming therefrom enters at the critical angle α, then it enters parallel to the light tunnel 72, passes through this, and triggers a large output signal LS in the sensor 73. This is converted by the control unit 4 into a parking signal PS, output at its control output 402, which operates a drive 211 of the adjustable mirror 21. This thereupon pivots the adjustable mirror 21 from the operating position 21a into its parking position 21b. In the illustrated exemplary embodiment, the control unit 4 has both a delay unit 41 as well as an integration unit 42. The delay unit 41 serves to trigger the pivoting of the mirror 21 with a delay, which stops pivoting from taking place even in the presence of brief spikes in the output signal LS. The integration unit 42 determines the quantity of light entering over a certain period, and only triggers a pivoting when a particular quantity of light per unit time has been exceeded or has been fallen below.

Figure 2:
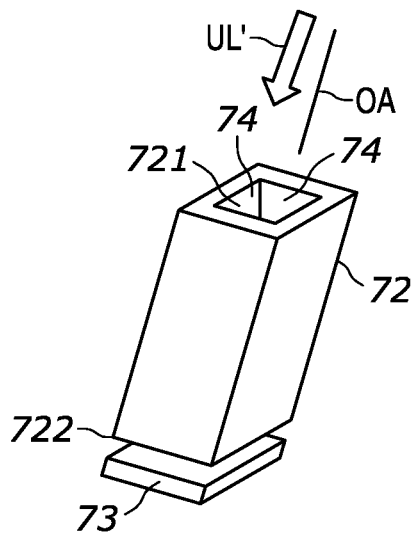
FIG. 2 shows a light tunnel.

FIG. 2 shows a light tunnel 72 in a first embodiment. It has a square cross-section and its four interior wall surfaces 74 are designed to be light absorbing. The inlet opening 721 of the light tunnel 72 can be seen at the upper end, while the light-sensitive sensor 73 is arranged at the lower end 722. In the illustration it is shown at a distance from the lower end 722, which is uncritical if no or very little light that has not passed through the light tunnel 72 falls on the light-sensitive surface of the sensor 73. Otherwise the sensor 73 is arranged directly at the light tunnel 72. The optical axis OA is here suggested schematically. It can be seen that ambient light UL' can only pass through the light tunnel 72 from the inlet opening 721 to its end 722 if it enters parallel to the optical axis OA, or only in a narrow angular range deviating from it.

Figure 3:
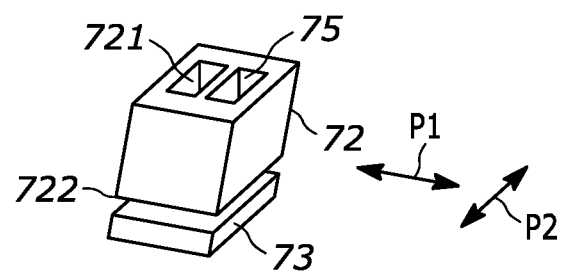
FIG. 3 shows a light tunnel with a separating wall.

FIG. 3 shows a light tunnel 72 according to a further embodiment, which comprises a separating wall 75. As a result of the separating wall 75, the effective cross-section of the light tunnel 72 is reduced, whereby the angular range in which light that enters can pass through the light tunnel 72 to the sensor 73 is reduced. In the present exemplary embodiment this is used to reduce the length of the light tunnel 72 from its inlet opening 721 to the bottom end 722. Due to the reduction, the angular range increases again, which in the final effect leads to a comparable angular range as with the light tunnel 72 illustrated in FIG. 2. This applies to the angular range lying in a direction suggested by the double arrow P1. Corresponding to a direction suggested by the double arrow P2, the angular range under which the incident light reaches the sensor 73 increases as a result of the shorter length of the light tunnel 72. This takes an elongated form of the display element 11 into account, wherein, in the direction of the greater extension, a greater critical angular range is also present under which the incident light can reach and thus damage the display element 11. The corresponding critical angular range in the direction of the shorter extension of the display element 11 is smaller.

Figure 4:
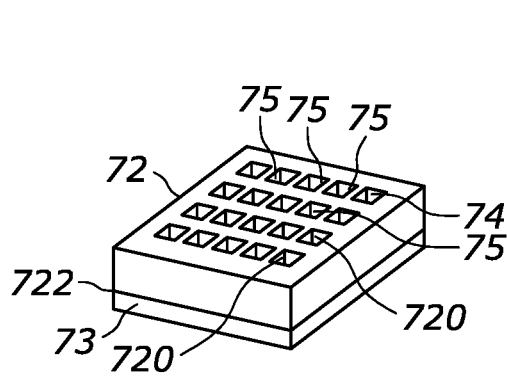
FIG. 4 shows a light tunnel with separating walls.

FIG. 4 shows a light tunnel 72 according to a further embodiment with a plurality of separating walls 75. Together with the wall surfaces 74, these form a plurality of small light tunnels 720 which have a small cross-section in comparison with their length. Although the light tunnel 72 of FIG. 4 is significantly shorter than the one shown for FIG. 2, the ratio of cross-sectional area to length in the small light tunnel 720 is in much the same range as that of the light tunnel 72 of FIG. 2. The light tunnels of FIG. 2 and FIG. 4 thus have a comparable angular selectivity. The sensor 73 of the exemplary embodiment illustrated in FIG. 4 is fastened directly to the bottom end 722 of the light tunnel 72, and only the light that has passed through the light tunnel 720 reaches it.

Figure 5:
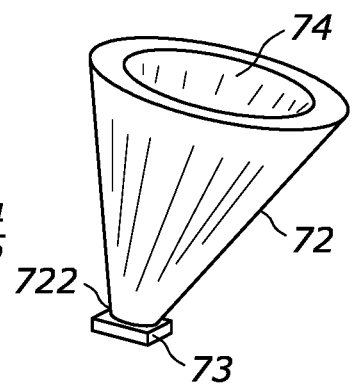
FIG. 5 shows a light tunnel with conically shaped wall surface.

FIG. 5 shows a light tunnel 72 with a conically shaped wall 74 as a further embodiment. The light tunnel 72 as a whole has the form of a truncated cone at whose bottom end 722 the light sensor 73 is arranged. The angular selectivity is achieved here through the opening angle of the cone. If the light tunnel 72 is integrated into a further component, for example the outer wall 76 of the head-up display, then in one case the light tunnel 72 only consists of a recess in the outer wall 76 which then forms the wall surface 74. Therefore, due to the cross-section which falls away inwards, can easily be manufactured with an injection molding method or another method for the manufacture of plastic parts.

Figure 6:
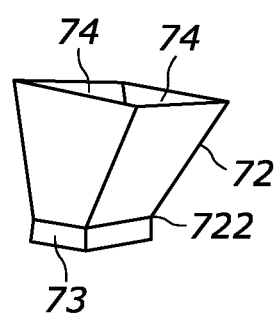
FIG. 6 shows another light tunnel with conically shaped wall surfaces.

FIG. 6 shows a light tunnel 72 with conically shaped, inclined wall surfaces 74 which together result in a cone truncation with a square cross-section as a further form of embodiment. The sensor 73 is located at the bottom end 722 of the light tunnel 72.

Figure 7:
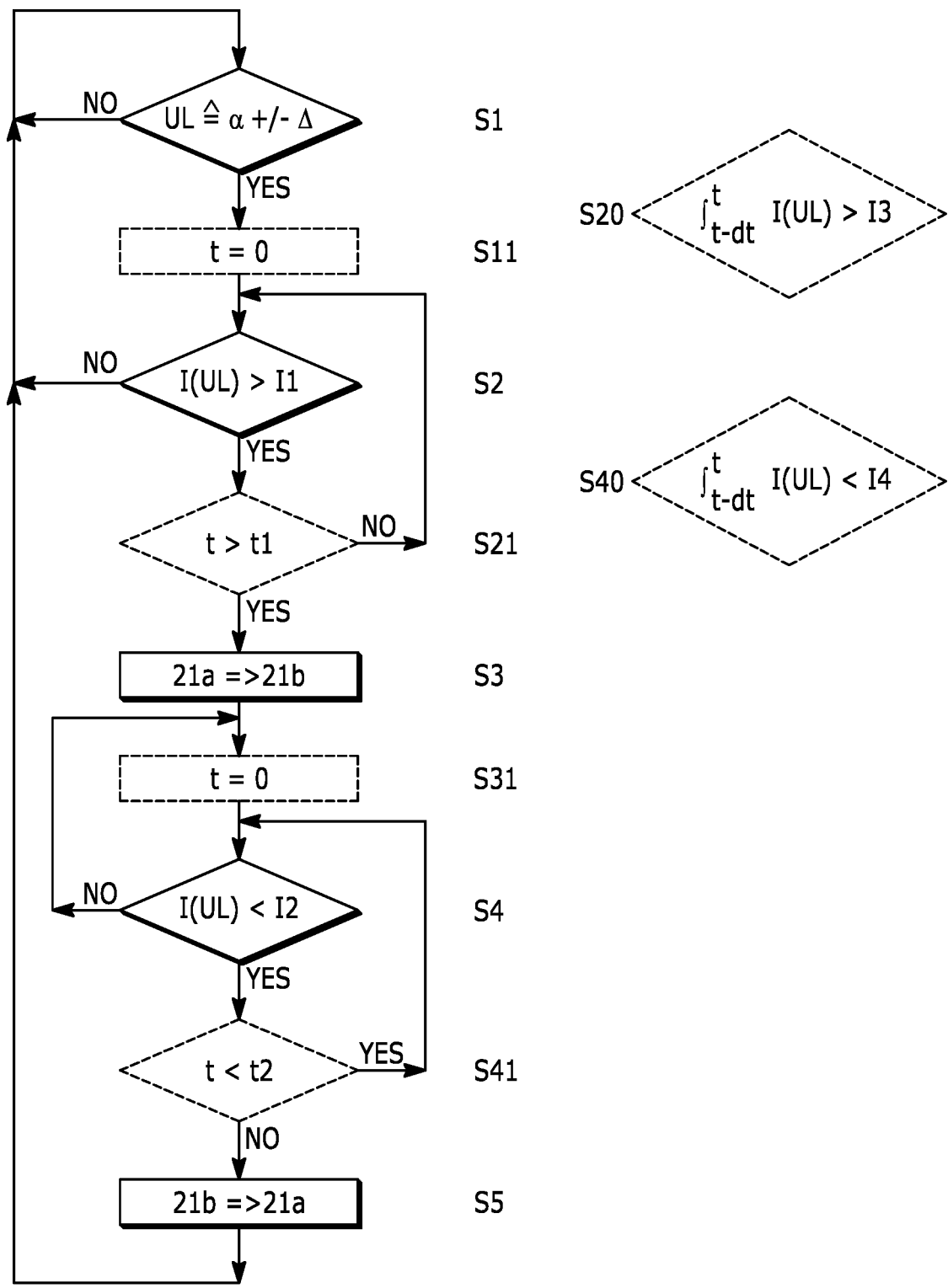
FIG. 7 shows a flowchart of one embodiment of a method according to the invention.

FIG. 7 shows a flowchart of a method. Alternative steps are shown there with dashed lines. A check is performed in step S1 as to whether ambient light UL enters within a critical angle range $\alpha+/-\Delta$ about the critical angle $\alpha$. If this is not the case, the process branches back to step S1. Otherwise a check is performed in step S2 as to whether the quantity of incident light I(UL) in the critical angular range $\alpha+/-\Delta$ exceeds a first threshold value I1. If this is not the case, the process branches back to step S1. Otherwise, the head-up display is moved in step S3 from an operating position 21a into a parking position 21b.

A check is made in step S4 as to whether the quantity of light I(UL) exceeds a second threshold value I2. If this is not the case, the process branches back to step S4. Otherwise, the head-up display is moved back from the parking position 21b into the operating position 21a in step S5. The process then branches back to step S1.

In an alternative variant, a counter is set to t=0 in an additional step S11 which follows step S1 in the event of a positive result. If the quantity of light I(UL) in the critical angle range exceeds the first threshold value I1, but the time t has not yet reached a first time t1, a branch is made back to step S2, otherwise to step S3. In this way the possibility that the parking position 21b is adopted even when the quantity of incident light I(UL) in the critical angle range exceeds the first threshold value I1 only briefly is avoided. These steps are for example implemented in the delay unit 41.

In an alternative variant, a counter is set to t=0 in an additional step S31 which follows step S3. Step S31 is then also executed if the result of step S4 is negative. If this is positive, and the time t that has elapsed since being set to zero exceeds a second time t2, then step S5 follows, otherwise a branch is taken back to step S4. In this way the possibility that the parking position is left when the light intensity I(UL) only exceeds the second threshold value I2 briefly, for example because, while the position of the sun remains the same, the vehicle has driven under a gantry or the branch of a tree which thereby briefly casts a shadow, is avoided. These steps are implemented, for example, in the delay unit 41.

In a further alternative variant, the step S2 is replaced by the step S20. In step S20, the quantity of light I(UL) is integrated over a period of time dt. If the integrated quantity of light exceeds the threshold value I3, then a branch is taken to step S21 or S3, otherwise to step S1. In this way, brief variations in the quantity I(UL) of incident light are averaged out, and do not lead to short-term jumps between the operating position 21a and the parking position 21b. These steps are implemented, for example, in the integration unit 42.

In a further alternative variant, the step S4 is replaced by the step S40. In step S40, the quantity of light I(UL) is integrated over a period of time dt. If the integrated quantity of light falls below the threshold value I4, then a branch is taken to step S41 or S5, otherwise to step S31 or to step S40. In this way, brief variations in the quantity I(UL) of incident light are averaged out, and do not lead to short-term jumps between the operating position 21a and the parking position 21b. These steps are implemented, for example, in the integration unit 42.

In other words, identifying the critical angle $\alpha$ of the position of the sun is a function of the head up display. If this position of the sun S is maintained over a critical time the head-up display is brought into a parking position 21b and switched off, so that no damage to the display element 11 is possible. The critical angle of the sun S is reached as soon as the sunbeams run parallel to the light path of the virtual image B. The light beams are then reflected onto the display element 11, and heat this up rapidly. The detection of the critical angle $\alpha$ is achieved through a light tunnel 72 that only allows through light that is at this special angle $\alpha$.

When the light-sensitive sensor 73 at the end of the light tunnel 72 is activated over a critical period, the head-up display is brought into parking position 21b in order to protect the display element 11. As soon as the critical position is left again, the head-up display is activated again. The time that leads to a critical temperature at the display element 11 depends on the device. It is generally in the range of a few minutes. Amongst other things, this depends on the size of the mirror 21, 22, on its magnification factor, and on other passive countermeasures. These are, for example, the application of polarization filters, or an additional coating of the mirror 21, 22. Reaching the parking position is thus not time-critical, but depends only on a timely shut-down. A repositioning of one of the mirrors 21, 22 can be realized within a few seconds.

In this procedure use is made of elements of a typical head-up display that already exist. Careful positioning of the light tunnel 72 close to the light path means that no additional components or safety measures are necessary. A light sensor and a parking position 21b are already used for other functions of the head-up display. One additional part is the light tunnel 72, which can be designed to be integrated into existing components. The light sensor, which has already been used, measures the ambient brightness in order to adjust the brightness of the light source 5 automatically. If the light sensor that is already present cannot be used, a second, simple sensor 73 is needed.

One advantage of the measures according to the invention is that they are not permanently active, but only if the sun is in a very particular position in which the ambient light UL is incident at the critical angle α, and if this is true over a certain period, which can lead to damage to the display element 11.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A head-up display comprising:
 a display element having an image projected onto a mirror unit of a vehicle;
 a deflection unit to project the image at a critical angle, wherein the image is reflected in the direction of an eye of a driver and overlaid on an image of the surroundings;
 a light-sensitive sensor, wherein the sensor detects ambient light coming from the mirror unit into the deflection unit at the critical angle;
 a control unit having a control input where a signal of the sensor is present, and a control output connected to a parking device;
 a light tunnel aligned according to the critical angle, and wherein the sensor is arranged at an end of the tunnel; and
 wherein the light tunnel further comprises a plurality of separating walls, which form a plurality of small light tunnels, wherein the cross-section of the diameter of the small light tunnels are small in comparison with their length.

2. The head-up display of claim 1, wherein the light tunnel further comprises at least one absorbing wall surface, at least one conically-shaped inclined wall surface; and at least one separating wall arranged between the wall surfaces.

3. The head-up display of claim 2, wherein the at least one separating wall is aligned parallel to at least one absorbing wall surface.

4. The head-up display of claim 1, wherein the light tunnel is arranged at a housing of the head-up display, wherein the head-up display is proximate to an outlet opening of the deflection unit.

5. The head-up display of claim 1, wherein the light tunnel has a length that is a multiple of its diameter.

6. The head-up display of claim 1, wherein the light tunnel is injection-molded into a housing of the head-up display.

7. The head-up display of claim 1, wherein the light tunnel has a square cross-section.

8. The head-up display of claim 1, wherein the light tunnel has a rectangular cross-section.

9. The head-up display of claim 1, wherein the control unit comprises at least one of a delay unit and an integration unit.

10. The head-up display of claim 1, further comprising a conically shaped wall surface and inclined separating surfaces that are all aligned to the same point of convergence.

11. The head-up display of claim 1, wherein the light tunnel is formed by a recess in an outer wall of the head-up display.

12. The head-up display of claim 1, wherein the light tunnel comprises conically shaped, inclined wall surfaces that form a truncated cone with a square cross-section.

13. A head-up display comprising:
 a display element having an image projected onto a mirror unit of a vehicle;
 a deflection unit to project the image at a critical angle, wherein the image is reflected in the direction of an eye of a driver and overlaid on an image of the surroundings;
 a light-sensitive sensor, wherein the sensor detects ambient light coming from the mirror unit into the deflection unit at the critical angle;
 a control unit having a control input where a signal of the sensor is present, and a control output connected to a parking device; and
 a light tunnel aligned according to the critical angle; and
 a conically shaped wall surface and inclined separating surfaces of the light tunnel that are all aligned to the same point of convergence.

14. The head-up display of claim 13, wherein the sensor is arranged at an end of the tunnel.

15. The head-up display of claim 13, wherein the light tunnel is arranged at a housing of the head-up display, wherein the head-up display is proximate to an outlet opening of the deflection unit.

16. The head-up display of claim 13, wherein the light tunnel is injection-molded into a housing of the head-up display.

17. The head-up display of claim 13, wherein the control unit comprises at least one of a delay unit and an integration unit.

18. A head-up display comprising:
 a display element having an image projected onto a mirror unit of a vehicle;
 a deflection unit to project the image at a critical angle, wherein the image is reflected in the direction of an eye of a driver and overlaid on an image of the surroundings;
 a light-sensitive sensor, wherein the sensor detects ambient light coming from the mirror unit into the deflection unit at the critical angle;

a control unit having a control input where a signal of the sensor is present, and a control output connected to a parking device;

a light tunnel aligned according to the critical angle, and wherein the sensor is arranged at an end of the tunnel; and wherein the light tunnel comprises conically shaped, inclined wall surfaces that form a truncated cone with a square cross-section.

19. The head-up display of claim 18, wherein the light tunnel is arranged in a housing of the head-up display, wherein the head-up display is proximate to an outlet opening of the deflection unit.

20. The head-up display of claim 18, wherein the light tunnel is injection-molded into a housing of the head-up display.

21. The head-up display of claim 18, wherein the control unit comprises at least one of a delay unit and an integration unit.

* * * * *